(12) United States Patent
Noguchi

(10) Patent No.: US 9,804,318 B2
(45) Date of Patent: Oct. 31, 2017

(54) LIGHTING DEVICE

(71) Applicant: HONDA MOTOR CO., LTD., Tokyo (JP)

(72) Inventor: Kohei Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 412 days.

(21) Appl. No.: 14/446,266

(22) Filed: Jul. 29, 2014

(65) Prior Publication Data

US 2015/0092438 A1      Apr. 2, 2015

(30) Foreign Application Priority Data

Sep. 27, 2013   (JP) ................. 2013-202525

(51) Int. Cl.
| | |
|---|---|
| *F21V 7/04* | (2006.01) |
| *F21V 8/00* | (2006.01) |
| *B62J 6/04* | (2006.01) |
| *F21S 8/10* | (2006.01) |

(52) U.S. Cl.
CPC ............ G02B 6/005 (2013.01); B62J 6/04 (2013.01); F21S 48/215 (2013.01); F21S 48/2212 (2013.01); F21S 48/2243 (2013.01); F21S 48/2268 (2013.01); F21S 48/2281 (2013.01); F21S 48/25 (2013.01); G02B 6/002 (2013.01); G02B 6/0073 (2013.01); G02B 6/0091 (2013.01)

(58) Field of Classification Search
CPC ........ B62J 6/04; F21S 48/215; F21S 48/2212; F21S 48/2243; F21S 48/2268; F21S 48/2281; F21S 48/25; G02B 6/002; G02B 6/005; G02B 6/0073; G02B 6/0091

USPC .................................. 362/606, 607
See application file for complete search history.

(56) References Cited

U.S. PATENT DOCUMENTS

| | | | | |
|---|---|---|---|---|
| 5,841,596 A | * | 11/1998 | Perlo ................. | G02B 5/1876 359/732 |
| 6,097,549 A | * | 8/2000 | Jenkins ............... | B60Q 1/302 359/726 |
| 6,814,475 B2 | * | 11/2004 | Amano ................ | F21S 48/215 362/240 |
| 6,926,432 B2 | * | 8/2005 | Rodriguez Barros ............. | B60Q 1/2665 362/494 |

(Continued)

FOREIGN PATENT DOCUMENTS

| | | |
|---|---|---|
| CN | 102774314 | 11/2012 |
| CN | 102937269 | 2/2013 |

(Continued)

OTHER PUBLICATIONS

English translation for JP2005327649A.*
Chinese Office Action for corresponding CN Application No. 201410394729.1, Jan. 28, 2016.

*Primary Examiner* — Tsion Tumebo
(74) *Attorney, Agent, or Firm* — Mori & Ward, LLP

(57) ABSTRACT

A lighting device includes an LED, a light guiding member, and a mask member. The light guiding member has a cut to provide a directivity to light emitted from the LED. The cut is provided at a position corresponding to the LED on an emission surface side of the light guiding member. The mask member is disposed on an emission surface side of the cut to block the light emitted from the LED.

22 Claims, 8 Drawing Sheets

(56) References Cited

U.S. PATENT DOCUMENTS

| | | | |
|---|---|---|---|
| 8,764,256 B2 * | 7/2014 | Foote | B60R 1/12 |
| | | | 362/494 |
| 8,814,391 B2 * | 8/2014 | Koh | G02B 6/0021 |
| | | | 313/512 |
| 9,075,172 B2 * | 7/2015 | Koh | G02B 6/0021 |
| 9,329,322 B2 * | 5/2016 | Yamada | G02B 19/0066 |
| 2006/0176710 A1 * | 8/2006 | Meinke | B60Q 1/2669 |
| | | | 362/503 |

FOREIGN PATENT DOCUMENTS

| | | |
|---|---|---|
| JP | 2010-108919 | 5/2000 |
| JP | 2005-123092 | 5/2005 |
| JP | 2005-327649 | 11/2005 |

* cited by examiner

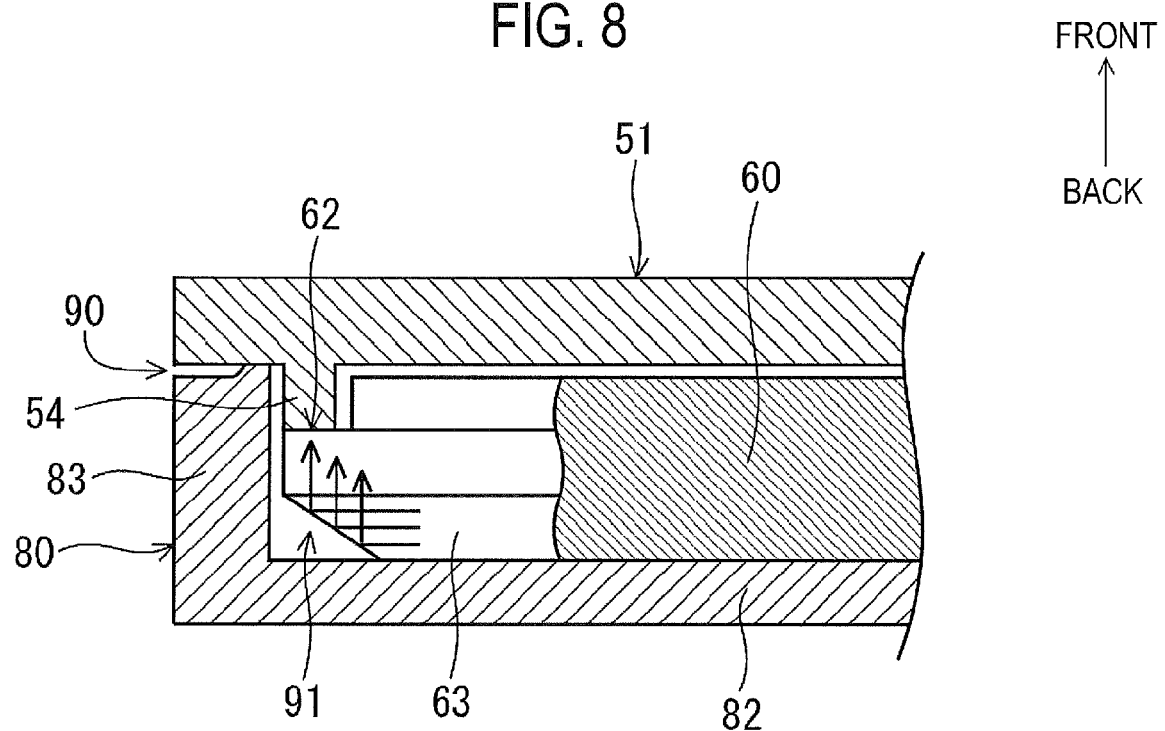

LIGHTING DEVICE

CROSS-REFERENCE TO RELATED APPLICATIONS

The present application claims priority under 35 U.S.C. §119 to Japanese Patent Application No. 2013-202525, filed Sep. 27, 2013, entitled "Lighting Device." The contents of this application are incorporated herein by reference in their entirety.

BACKGROUND OF THE INVENTION

Field of the Invention

The present invention relates to a lighting device.

Discussion of the Background

Heretofore, various lighting devices which use LEDs as a light source have been known. Since the directivity of light emitted from LEDs is high, a light guiding member configured to guide emitted light in a predetermined direction is sometimes used in a configuration of a lighting device so that emission can be achieved in a certain direction.

Japanese Patent Application Publication No. 2005-123092 discloses a vehicle lighting device including: thin rectangular LEDs as a light source; and a plate-shaped light guiding member, which is disposed to face the LEDs, and which has squared recesses formed correspondingly to the LEDs, and also has mortar-shaped concave portions formed at the emission surface side so that emitted light from the LEDs can be scattered radially in a direction perpendicular to the emission direction.

SUMMARY OF THE INVENTION

According to one aspect of the present invention, a lighting device includes an LED as a light source and a light guiding member. The light guiding member has a cut formed to provide a certain directivity to emitted light from the LED. The cut is formed at a position corresponding to the LED, at an emission surface side of the light guiding member, and a mask member configured to block the emitted light from the LED is disposed on an emission surface side of the cut.

According to another aspect of the present invention, a lighting device includes an LED, a light guiding member, and a mask member. The light guiding member has a cut to provide a directivity to light emitted from the LED. The cut is provided at a position corresponding to the LED on an emission surface side of the light guiding member. The mask member is disposed on an emission surface side of the cut to block the light emitted from the LED.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 is a cross-sectional view of peripheral portions of the lighting device.

DESCRIPTION OF THE EMBODIMENTS

Figure 1:
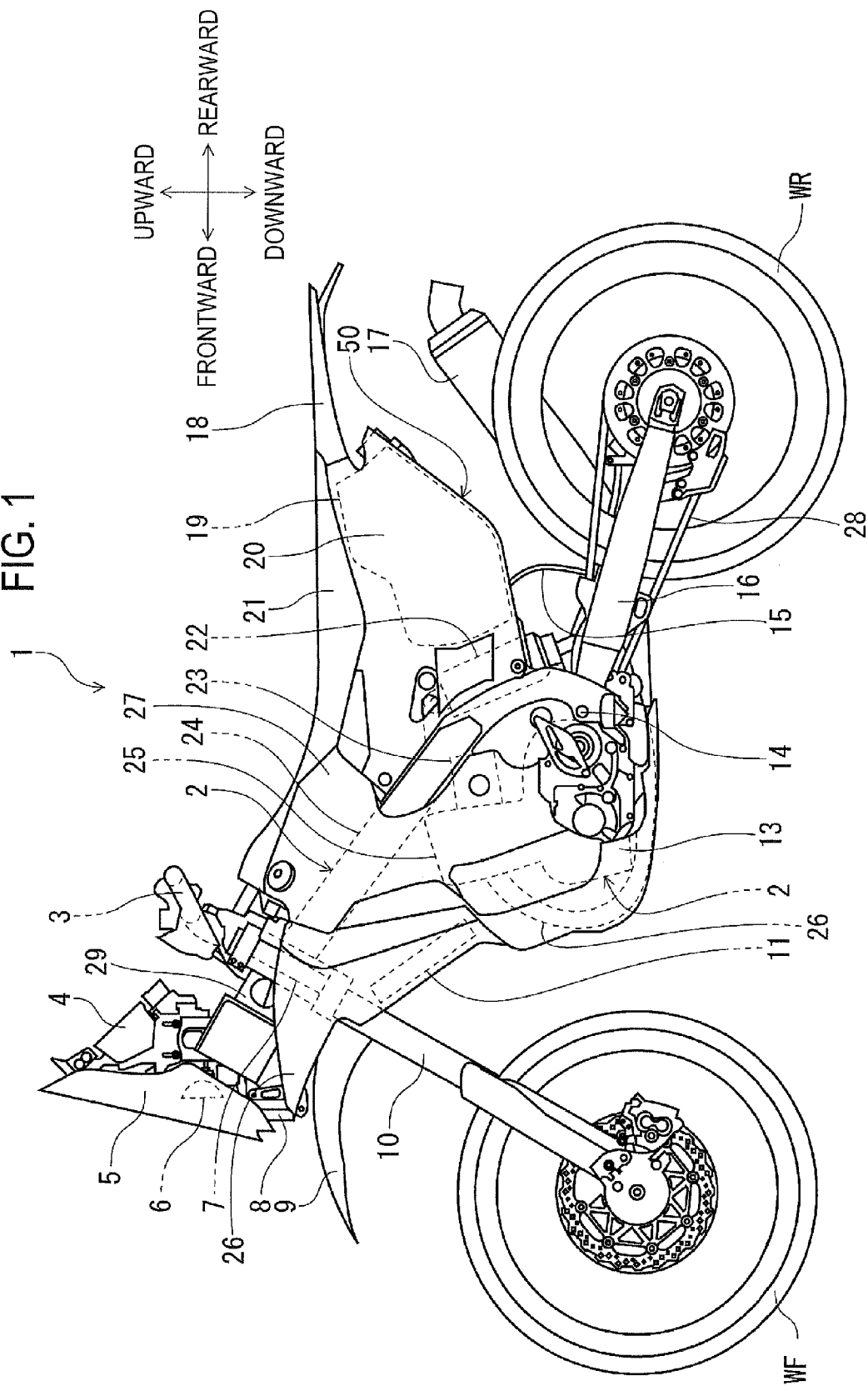
FIG. 1 is a left-side view of a motorcycle to which a lighting device according to an embodiment of the present invention is applied.

The embodiments will now be described with reference to the accompanying drawings, wherein like reference numerals designate corresponding or identical elements throughout the various drawings.

Hereinafter, an embodiment of the present invention will be described in detail with reference to the drawings. FIG. 1 is a left-side view of a motorcycle 1 to which a lighting device according to an embodiment of the present invention is applied. The motorcycle 1 is an off-road racing vehicle adapted to rough terrain.

A head pipe 7 is provided to a front end portion of a main frame 24 constituting a vehicle body frame 2. The head pipe 7 is configured to rotatably and pivotally support an unillustrated steering system. To the steering system, a pair of left and right front forks 10 are attached. The front forks 10 are configured to rotatably and pivotally support a front wheel WF. The front wheel WF can be steered by a steering handle 3 attached to an upper portion of the front forks 10.

On a rear lower portion of the main frame 24, a swingarm 16 is swingably and pivotally supported by a pivot shaft 14. The swingarm 16 is configured to rotatably and pivotally support a rear wheel WR which is a driving wheel. The swingarm 16 is suspended from the main frame 24 with a rear cushion 22. Behind the rear cushion 22, a rear fender 15 is disposed, which is configured to receive a splash of mud and the like from the rear wheel WR.

Below the main frame 24, an engine 2 is attached. An exhaust pipe 26 is attached to a vehicle-body front side of a cylinder head 25 of the engine 2. The exhaust pipe 26 communicates with a muffler 17 at a vehicle-body rear side. On the other hand, a throttle body-type fuel injection device 23 and an unillustrated air cleaner box are connected to the vehicle-body rear side of the cylinder head 25. A rotational driving force generated by the engine 2 is transmitted to the rear wheel WR through a drive chain 28.

A side cowl 27 is disposed at a location covering from a lateral side of the engine 2 to an upper portion of the main frame 24. An under cowl 13 communicating with the side cowl 27 is attached to portions surrounding the exhaust pipe 26. In the side cowl 27 above the main frame 24, unillustrated oil tank and cooling water tank are disposed. A front cowl 26 communicating with the side cowl 27 is attached on an outer side of the front forks 10 in a vehicle width direction. A radiator 11 for cooling water is disposed at a position inside the front cowl 26 and at the vehicle-body front side of the cylinder head 25.

A meter stay 29 extends frontward from a head pipe 7. To the meter stay 29, a meter device 4 and a headlamp 6 are attached, whose front surface sides are covered with a windshield screen 5. Below the windshield screen 5, an oil cooler 8 is disposed, below which a front fender 9 is disposed. The front fender 9 is attached to the front forks 10.

A pair of large left and right seat cowls 20 are attached behind the cylinder head 25 and above the main frame 24. The seat cowls 20 are constituted of rigid members. On upper portions of the seat cowls 20, a seat 21 is supported. A fuel tank 19 is disposed inside the seat cowls 20. A rear cowl 18 continuous with the seat 21 is attached to rear ends of the seat cowls 20. A lighting device 50 according to the embodiment of the present invention is used as a thin tail lamp device attached to a rear surface of a lower portion of the fuel tank 19.

Figure 2:
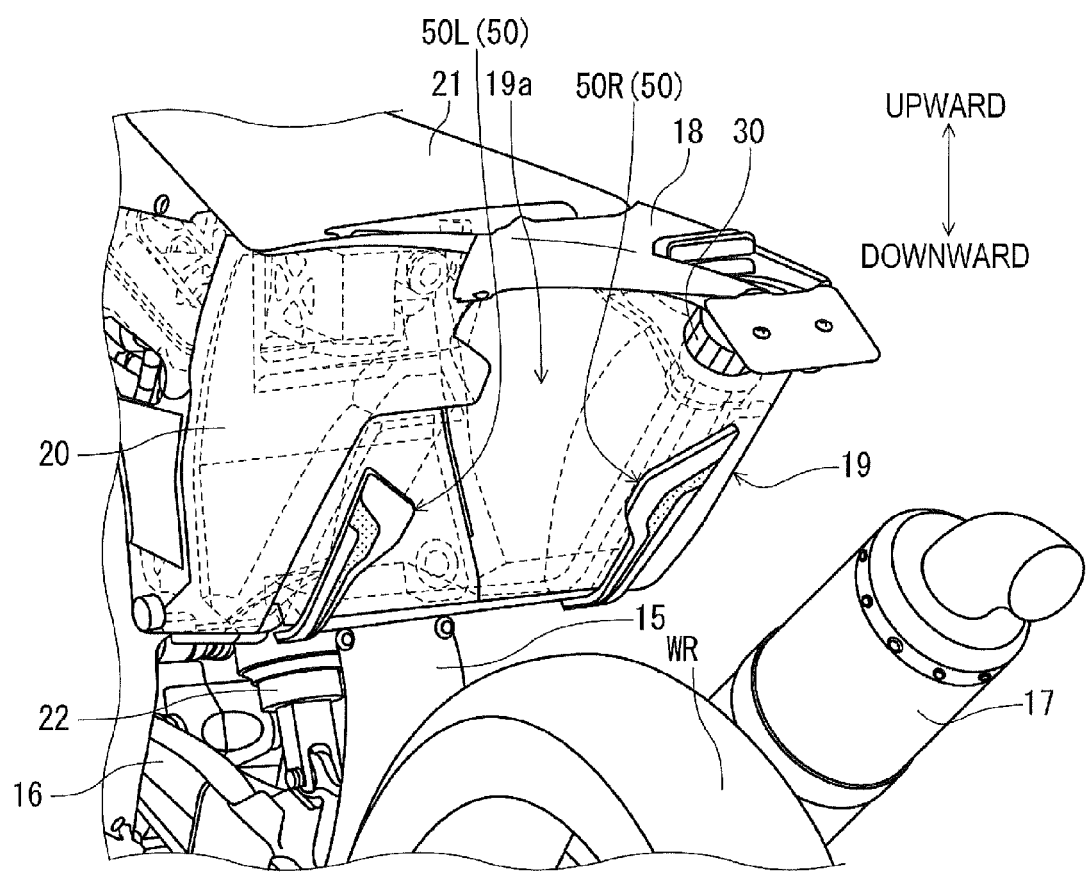
FIG. 2 is a partially enlarged perspective view of the motorcycle seen obliquely leftward from the rear.

FIG. 2 is a partially enlarged perspective view of the motorcycle 1 seen obliquely leftward from the rear. The fuel tank 19 is formed to have such a wide shape as to occupy a space between the left and right seat cowls 20. At the center of a rear portion of the fuel tank 19, an escape portion 19a is provided to prevent an interference with the rear wheel WR. A fuel cap 30 is attached to an upper rear end portion at the right side of the fuel tank 19 in the vehicle width direction.

The lighting device 50 (50L, 50R) according to the embodiment of the present invention is a pair of left and right tail lamp devices that emit red light. The lighting device 50 has such a shape that a portion thereof is curved along a lower surface and an inclined surface of the fuel tank 19, the inclined surface being continuous with the lower surface rearwardly. The lighting device 50 is a plate-shaped instrument approximately several millimeters in thickness/several tens of grams in weight, and is fixed to the fuel tank 19 with an adhesive. To the lighting device 50, a wire extending from the vehicle body for power supply is connected. A drive circuit for LEDs 71 is disposed inside the seat cowls 20.

Figure 3:
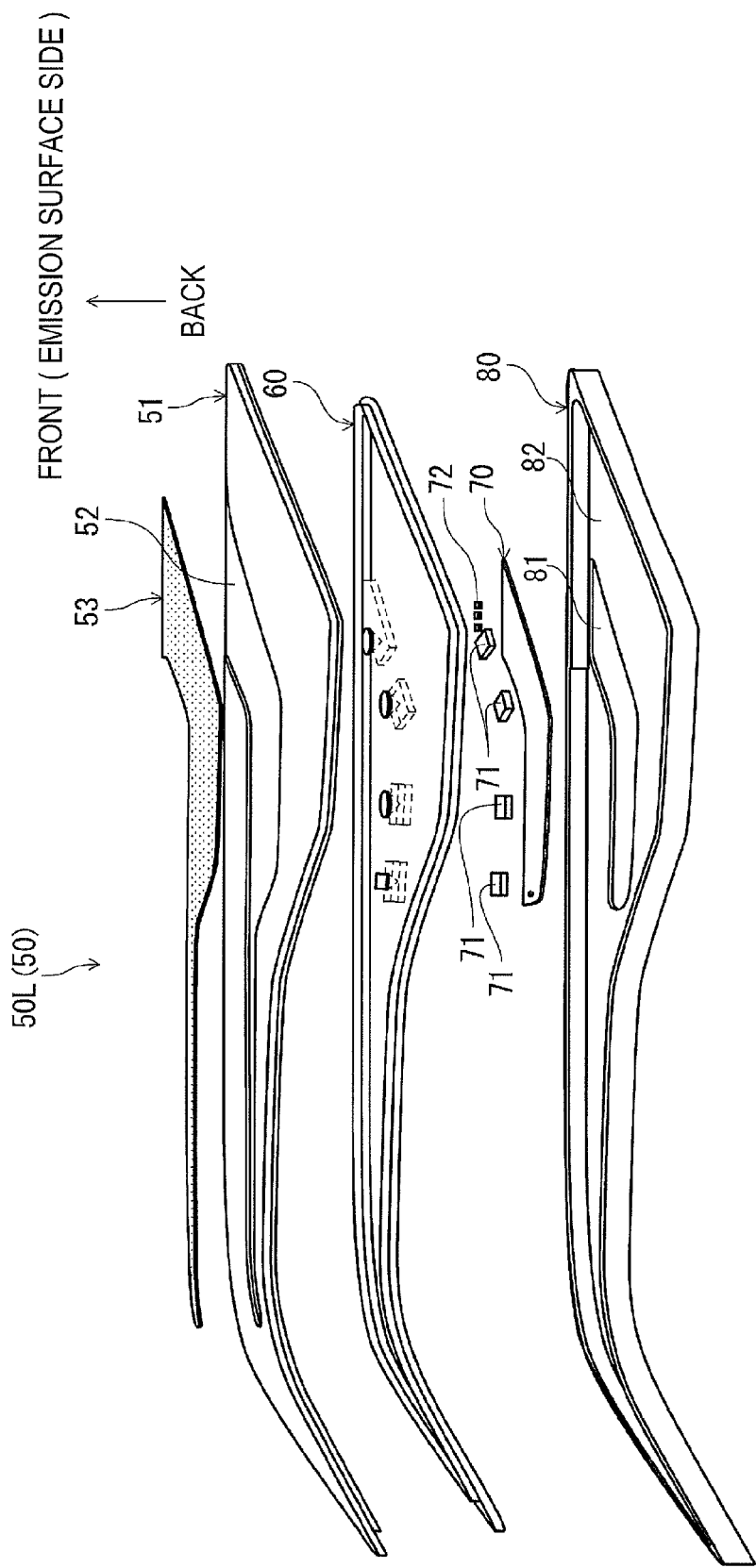
FIG. 3 is an exploded perspective view of the lighting device.

FIG. 3 is an exploded perspective view of the lighting device 50. The lighting device 50 according to the present embodiment has a right-left symmetrical shape. Hereinafter, the description of the structure will be given using the lighting device 50L on the left side in the vehicle width direction. The lighting device 50 includes: thin rectangular white LEDs 71; a board 70 on which the LEDs 71 are mounted; a case 80 to which the board 70 is fixed; a colorless, transparent light guiding member 60 disposed to face the LEDs 71; a red transparent lens 51 configured to cover the light guiding member 60; and a black mask member 53 attached to the lens 51. In the present embodiment, four LEDs 71 are mounted on the board 70.

When the lighting device 50 is assembled, an emission surface side of the LEDs 71 is designed as a front side, and the lens 51 and the mask member 53 are all configured to be accommodated in an opening formed on a front side of the case 80. The lighting device 50 is attached to the fuel tank 19 with an adhesive member disposed on a back surface side of a bottom surface of the case 80.

The light guiding member 60 and the lens 51 can be formed of an acrylic or the like that transmits light emitted from the LEDs 71. On the other hand, it is only necessary that the mask member 53 have a function of blocking emitted light. The mask member 53 may be formed of a black-color resin, or may be provided with a knitted carbon-like appearance or the like.

The board 70 is accommodated in a board-accommodating recess 81 formed in a bottom portion 82 of the case 80, and is fixed flush with or substantially flush with the bottom portion 82. Meanwhile, the mask member 53 is accommodated in a mask member-accommodating recess 52 formed in the lens 51, and is fixed flush with or substantially flush with the surface of the lens 51. In the present embodiment, a bottom portion of the mask member-accommodating recess 52 is painted in black. Further, terminals 71, to which the wire for power supply is connected, are attached to a corner of the board 70.

Figure 4:
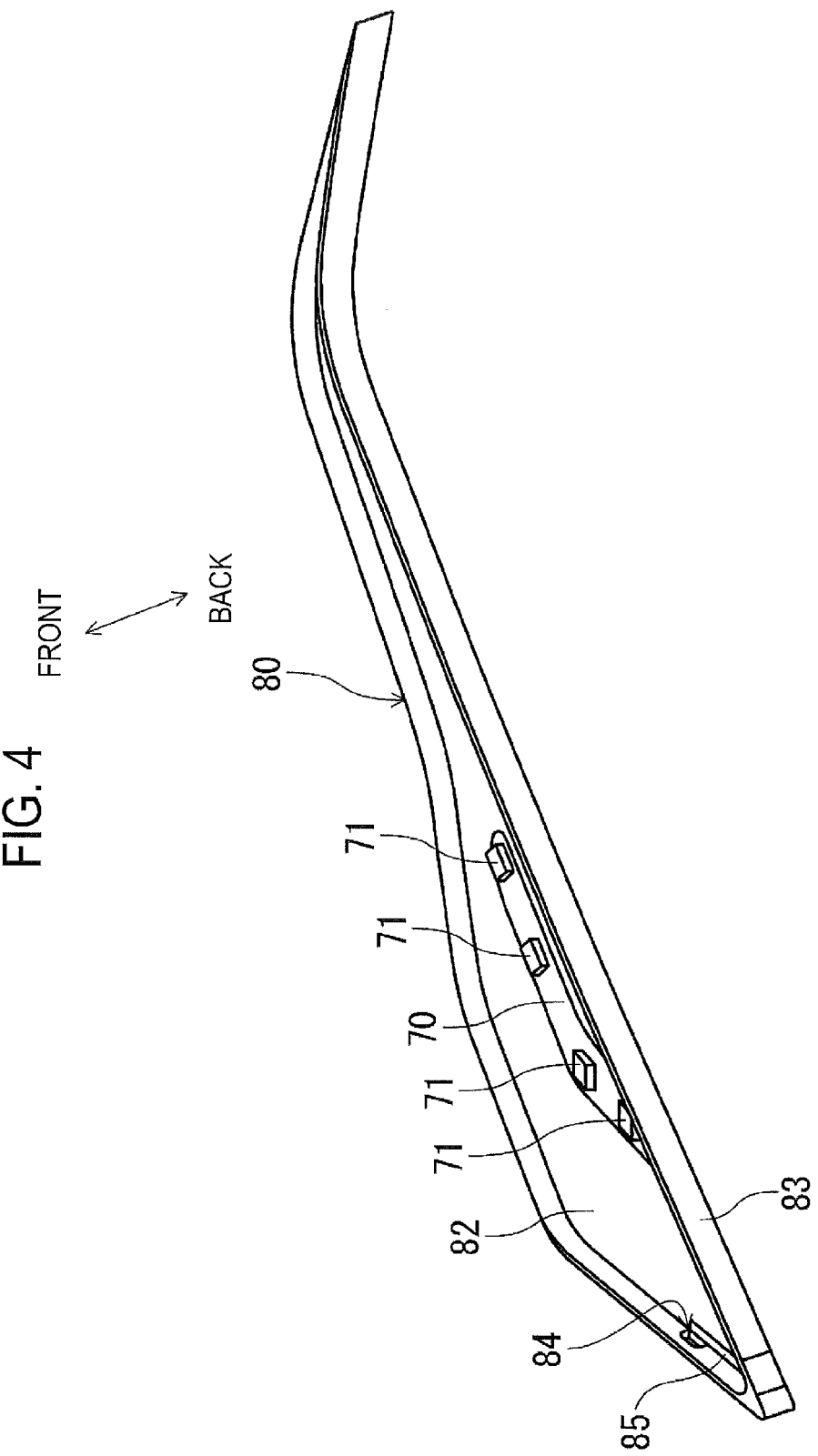
FIG. 4 is a perspective view for illustrating a state in which a board having LEDs mounted thereon is fixed to a case.
Figure 5:
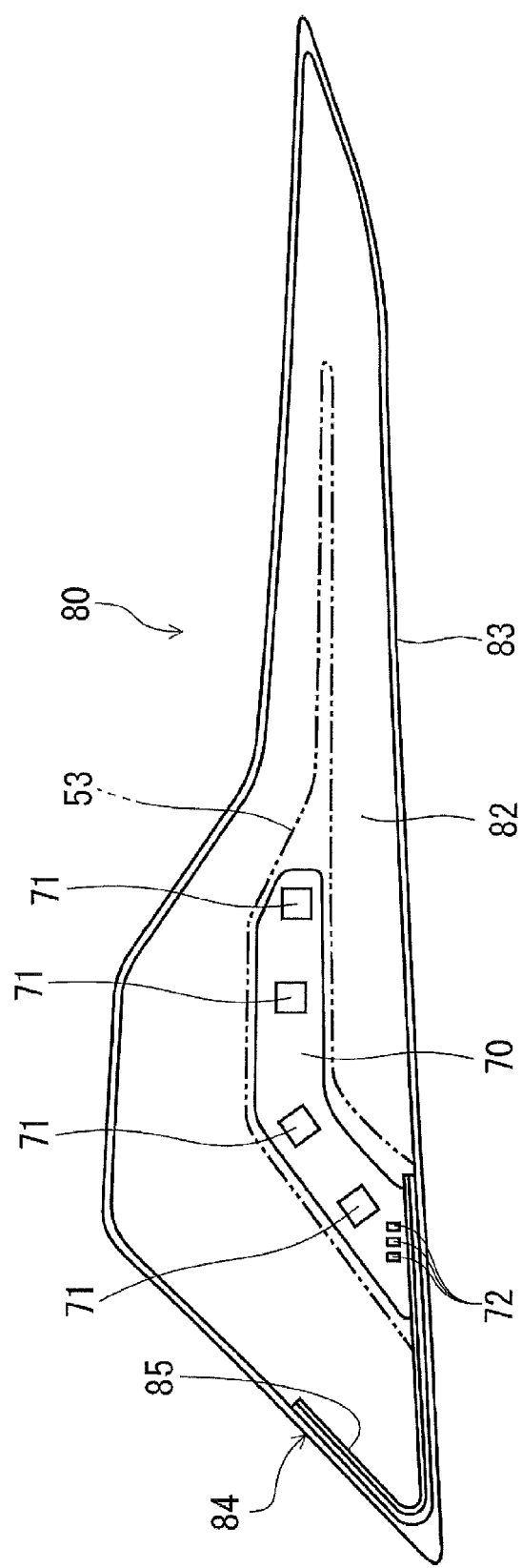
FIG. 5 is a front view of the case to which the board having the LEDs mounted thereon is fixed.

FIG. 4 is a perspective view for illustrating a state in which the board 70 having the LEDs 71 mounted thereon is fixed to the case 80. Moreover, FIG. 5 is a front view of the case 80 to which the board 70 having the LEDs 71 mounted thereon is fixed. The case 80 has a shape that is narrowed from a wide-width portion, which is located at an upper side when attached to the vehicle body, toward a tip end at a vehicle-body lower side. The case 80 has a lateral wall 83 provided on an outer peripheral portion of the bottom portion 82 made of a white resin or the like, the lateral wall 83 being made of a black resin or the like. The bottom portion 82 and the lateral wall 83 can be formed integrally by welding.

The board 70 is disposed in such a manner that an edge at an outer side of the board 70 in the vehicle width direction is located at a position adjacent to the lateral wall in the wide-width portion of the case 80. The mask member 53 has such a shape that the mask member 53 covers the entire emission surface side of the board 70, and extends to the narrow-width portion of the case 80 in a tapered manner. In the bottom portion 82 of the case 80, a wire-accommodating recess 85 is formed for accommodating a wire connected to terminals 72. In the lateral wall 83 near an end portion of the wire-accommodating recess 85, a through hole 84 is provided, through which the wire passes.

Figure 6:
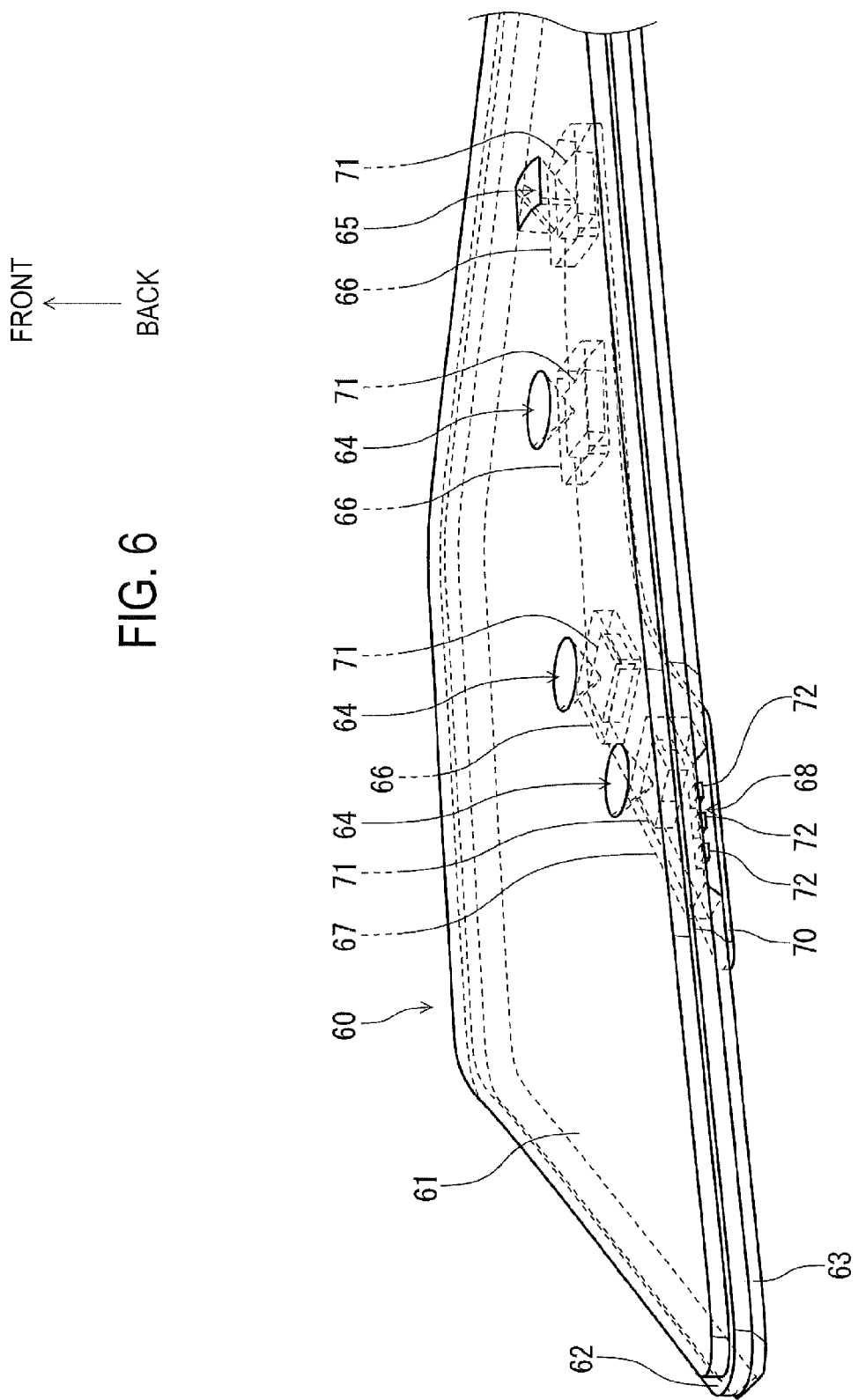
FIG. 6 is a partially enlarged perspective view of a light guiding member.

FIG. 6 is a partially enlarged perspective view of the light guiding member 60. The light guiding member 60 has a configuration that multiple recesses and cuts are provided in a plate-shaped resin member having a uniform thickness. At positions of a back surface side thereof corresponding to the LEDs 71, rectangle-shaped LED-accommodating recesses 66 configured to accommodate the LEDs 71 are formed. Moreover, at positions of a front side of the light guiding member 60 corresponding to the LED accommodating recesses 66, cuts 64, 65 are formed to scatter emitted light from the LEDs 71.

In the present embodiment, the cuts 64 corresponding to three LEDs 71 disposed at the wide-width side of the case 80 are formed in a substantially cone shape and configured to scatter emitted light uniformly in a radial pattern. In contrast, the cut 65 corresponding to one LED 71 disposed at the narrow-width side of the case 80 is formed in a triangular prism-like wedge shape so that the emitted light can reach to the tip end of the narrow-width portion.

In a lateral end portion of the light guiding member 60 adjacent to the board 70, a wire-pull-out recess 68 is formed for accommodating the terminals 72 and for pulling out the wire connected to the terminals 72. In addition, an outer edge portion of the light guiding member 60 is provided with a step portion 62 formed from an outwardly protruding portion, and an inclined surface 63 formed under the protruding portion.

Figure 7:
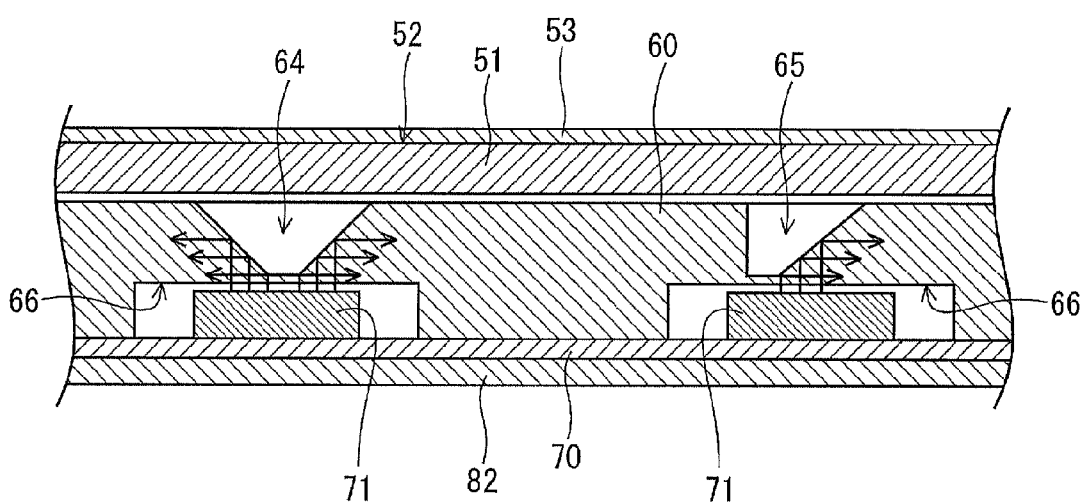
FIG. 7 is a cross-sectional view of a portion of the lighting device where the LEDs are disposed.

FIG. 7 is a cross-sectional view of a portion of the lighting device 50 where the LEDs 71 are disposed. When the lighting device 50 is assembled, the bottom portion 82 of the case 80, the board 70, the light guiding member 60, and the lens 51, and the mask member 53 are disposed adjacent to each other in line in this order from the back side of the lighting device 50.

In the present embodiment, a narrow gap is formed between an upper surface of the LED 71 and an upper surface of the LED-accommodating recess 66, so that heat generated by light emission from the LEDs 71 does not influence the light guiding member. Further, the cone-shaped cut 64 and the wedge-shaped cut 65 are formed in such a manner that bottom portions thereof do not communicate with the LED-accommodating recesses 66, respectively. Hence, the cone-shaped cut 64 has such a shape that a top portion of the cone is slightly cut; meanwhile, the wedge-shaped cut 65 has such a shape that an edge including a top portion of the triangular prism is slightly cut.

Because of the cuts 64, 65, a lot of emitted light from the LEDs 71 is reflected in a horizontal direction by a lateral surface of the cone of the cone-shaped cut 64 and by a lateral surface of the triangular prism of the wedge-shaped cut 65. In addition, the mask member 53 configured to block emitted light is disposed at the positions corresponding to the cuts 64, 65. Accordingly, when the lighting device 50 is viewed from the outside, it is impossible to observe the positions where the LEDs 71 emit light, and the entire lens 51 looks like demonstrating perfect surface emission.

Furthermore, in the present embodiment, since the mask member-accommodating recess 52 is painted in black, emitted light is more effectively blocked. Moreover, since the bottom portion 82 of the case 80 is white, the reflection takes place more toward the emission surface, thereby increasing the luminance of the surface emission.

Note that, in the present embodiment, the cuts 64, 65 are formed in such a manner that the bottom portions do not communicate with the LED-accommodating recesses 66, so that emitted light emitted to the bottom portions of the cuts 64, 65 can be reflected in the horizontal direction to some extent. Nevertheless, the cuts 64, 65 may be formed in such a manner that the bottom portions communicate with the LED-accommodating recesses 66, or the top portions of the cones and the triangular prism are provided close to a ceiling surface of the LED-accommodating recesses 66.

FIG. 8 is a cross-sectional view of peripheral portions of the lighting device 50. After the board 70 is fixed to the case 80 with an adhesive material or the like, the light guiding member 60 is accommodated into the case 80, and the lens 51 is fixed thereto in such a manner as if a lid is put on the opening of the case 80, so that assembling of the lighting device 50 is completed. The step portion 62 formed at the peripheral edge of the light guiding member 60 is in contact with a bulging portion 54 formed at a peripheral edge of the lens 51. Thereby, a predetermined gap is provided between the front surface side of the light guiding member 60 and a back surface side of the lens 51; additionally, each part is positioned in the horizontal direction and in a laminated direction.

Moreover, the lens 51 is fixed to the case 80 using an adhesive that is filled in a gap 90 formed on the lateral wall 83. Since no other fastening member or the like is used, the structure is simplified, and reductions in the number of parts and the weight of the lighting device are achieved. Additionally, since there is no fastening member or the like on the surface emission portion, it is possible to improve the appearance as well.

Further, the inclined surface 63 formed under the step portion 62 has such a function that emitted light reflected in the horizontal direction by the cuts 64, 65 is reflected toward the emission surface. This intensifies emitted light at an outer peripheral end portion of the lens 51 corresponding to the inclined surface, and a novel appearance can be obtained, in which the outer periphery of the lens 51 is trimmed by the emitted light.

Furthermore, providing the inclined surface 63 to the light guiding member 60 forms a space 91 between the inclined surface 63 and the case 80. Thereby, a wire extending from the board 70 is arranged in the space 91, which enables effective space utilization. Moreover, the wire drawn along the wire-accommodating recess 85 (see FIG. 5) hardly comes into contact with the light guiding member 60 during the assembling of the lighting device 50, and it is no longer necessary to apply an extra force for pushing down the wire during the assembling. This facilitates the assembling operation. In addition, lateral walls can be reduced in thickness, and the wire-accommodating recess 85 may be eliminated to thus simplify the shape of the case as well.

Note that the structure of the lighting device, the shape, material, and color of the LEDs, the case, the light guiding member, the lens, and the mask member, the shape of the cuts formed in the light guiding member, the number and structure of the LEDs, and the like are not limited to those in the above-described embodiments. Various modifications can be made. For example, a lighting device having the same structure as that of the embodiment of the present invention is not limited to a tail lamp device of a vehicle, and the embodiment of the present invention may be applied to position lamps and so forth. Further, the lighting device according to the embodiment of the present invention is applicable to lighting instruments used for various usages besides lighting devices attached to various vehicles such as four-wheeled vehicles without limitation to the motorcycle.

A first aspect of the embodiment of the present invention provides a lighting device (50) having an LED (71) as a light source and a light guiding member (60) having a cut (64, 65) formed to provide a certain directivity to emitted light from the LED (71). The cut (64, 65) is formed at a position corresponding to the LED (71), at an emission surface side of the light guiding member (60). A mask member (53) configured to block the emitted light from the LED (71) is disposed on an emission surface side of the cut (64, 65).

Moreover, a second aspect of the embodiment of the present invention provides the lighting device (50) including a case (80) having an opening at an emission surface side thereof to surround the light guiding member (60), and a lens (51) configured to cover the opening of the case (80). The light guiding member (60) is sandwiched between the case (80) and the lens (51), and the mask member (53) is attached to the lens (51).

Further, a third aspect of the embodiment of the present invention provides the lighting device, in which a mask member-accommodating recess (52) configured to accommodate the mask member (53) is formed at an emission surface side of the lens (51).

Additionally, a fourth aspect of the embodiment of the present invention provides the lighting device, in which the mask member-accommodating recess (52) is painted in a certain color.

Moreover, a fifth aspect of the embodiment of the present invention provides the lighting device, in which an LED-accommodating recess (66) configured to accommodate the LED (71) is formed in a surface of the light guiding member (60) at a side opposite to the emission surface side, and a board (70) for the LED (71) is accommodated in a board-accommodating recess (81) formed in a bottom portion (82) of the case (80).

Further, a sixth aspect of the embodiment of the present invention provides the lighting device, in which an inclined surface (63) is formed on an outer peripheral end portion of the light guiding member (60) at a side of a bottom portion of the case, and a space (91) is formed between the case (80) and the inclined surface (63) when the lighting device (50) is assembled.

Furthermore, a seventh aspect of the embodiment of the present invention provides the lighting device, in which the case (80) has a white bottom portion (82).

According to the first aspect of the embodiment of the present invention, the cut is formed at the position corresponding to the LED, at the emission surface side of the light guiding member, and the mask member configured to block the emitted light from the LED is disposed on the emission surface side of the cut. Accordingly, light from the light source is directed horizontally by the cut and then emitted; further, and the light source and the cut are masked by the mask member. Hence, the lighting device can look like demonstrating perfect surface emission.

According to the second aspect of the embodiment of the present invention, the lighting device includes the case having the opening at the emission surface side to surround the light guiding member, and the lens configured to cover the opening of the case. The light guiding member is sandwiched between the case and the lens, and the mask member is attached to the lens. This makes it possible to configure the lighting device with a simple structure.

According to the third aspect of the embodiment of the present invention, the mask member-accommodating recess configured to accommodate the mask member is formed at the emission surface side of the lens. This facilitates positioning of the mask member in relation to the lens, making it possible to prevent the mask member from protruding from the lens. Moreover, as the lens is flush with the mask member, the appearance can be improved.

According to the fourth aspect of the embodiment of the present invention, the mask member-accommodating recess is painted in a certain color. Accordingly, emitted light travelling straight from the LEDs toward the lens surface is blocked, which can enhance the effect that the entire lighting device looks like demonstrating surface emission.

According to the fifth aspect of the embodiment of the present invention, the LED-accommodating recess configured to accommodate the LED is formed in the surface of the light guiding member at the side opposite to the emission surface side, and the board for the LED is accommodated in the board-accommodating recess formed in the bottom portion of the case. This makes it possible to reduce the dimension in a thickness direction of the lighting device.

According to the sixth aspect of the embodiment of the present invention, the inclined surface is formed on the outer peripheral end portion of the light guiding member at the side of the bottom portion of the case, and the space is formed between the case and the inclined surface when the lighting device is assembled. Accordingly, emitted light scattered in an outer peripheral direction of the light guiding member can be reflected in an emission surface direction. This intensifies emitted light at an outer peripheral end portion of the lens corresponding to the inclined surface, and a novel appearance can be obtained, in which the outer periphery of the lens is trimmed by the emitted light. Moreover, drawing a wire extending from the board by utilizing the space enables effective space utilization and simplification of the shape of the case.

According to the seventh aspect of the embodiment of the present invention, since the case has the white bottom portion, emitted light from the LED is actively reflected to the emission surface side, so that the surface emission with a high luminance can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A lighting device comprising:
   an LED as a light source;
   a light guiding member formed of a plate-shaped member having a uniform thickness and having a cut formed to provide a certain directivity to emitted light from the LED;
   wherein the cut is formed at a position corresponding to the LED, at an emission surface side of the light guiding member;
   a case having an opening at an emission surface side thereof to surround the light guiding member;
   a lens configured to cover the opening of the case; and
   a mask member configured to block the emitted light from the LED is disposed on the lens on an emission surface side of the cut, wherein
   the light guiding member includes an outer peripheral edge having:
      a step portion formed on the emission surface side of the light guiding member; and
      an inclined surface formed on a side opposed to the emission surface side of the light guiding member, and
   the lens having a bulging portion formed at a peripheral edge thereof, the bulging portion projecting towards the light guiding member and directly contacting the step portion of the outer peripheral edge of the light guiding member.

2. The lighting device according to claim 1, wherein
   the light guiding member is sandwiched between the case and the lens, and
   the mask member is attached to the lens.

3. The lighting device according to claim 1, wherein a mask member-accommodating recess configured to accommodate the mask member is formed at an emission surface side of the lens.

4. The lighting device according to claim 3, wherein the mask member-accommodating recess is painted in a predetermined color.

5. The lighting device according to claim 2, wherein
   an LED-accommodating recess configured to accommodate the LED is formed in a surface of the light guiding member at a side opposite to the emission surface side, and
   a board for the LED is accommodated in a board-accommodating recess formed in a bottom portion of the case.

6. The lighting device according to claim 2, wherein
   the inclined surface is formed on an outer peripheral end portion of the light guiding member at a side of a bottom portion of the case, and
   a space is formed between the case and the inclined surface when the lighting device is assembled.

7. The lighting device according to claim 2, wherein the case has a white bottom portion.

8. The lighting device according to claim 1, wherein the case has a bottom portion, and
   wherein the bottom portion, the plate-shaped member, and the lens extend planarly and in parallel with each other in at least an area overlapping the LED.

9. A lighting device comprising:
   an LED;
   a light guiding member formed of a plate-shaped member having a uniform thickness and having a cut to provide a directivity to light emitted from the LED, the cut being provided at a position corresponding to the LED on an emission surface side of the light guiding member;

a case having an opening at an emission surface side thereof to surround the light guiding member;

a lens configured to cover the opening of the case; and a mask member disposed on an emission surface side of the cut to block the light emitted from the LED, wherein the light guiding member includes an outer peripheral edge having:

a step portion formed on the emission surface side of the light guiding member; and an inclined surface formed on a side opposed to the emission surface side of the light guiding member, and the lens having a bulging portion formed at a peripheral edge thereof, the bulging portion projecting towards the light guiding member and directly contacting the step portion of the outer peripheral edge of the light guiding member.

10. The lighting device according to claim 9, wherein a lens configured to cover the opening of the case, the light guiding member is sandwiched between the case and the lens, and the mask member is attached to the lens.

11. The lighting device according to claim 9, wherein a mask member-accommodating recess configured to accommodate the mask member is provided on an emission surface side of a lens.

12. The lighting device according to claim 11, wherein the mask member-accommodating recess is painted in a predetermined color.

13. The lighting device according to claim 10, wherein an LED-accommodating recess configured to accommodate the LED is provided in a surface of the light guiding member at a side opposite to the emission surface side of the light guiding member, and a board for the LED is accommodated in a board-accommodating recess provided in a bottom portion of the case.

14. The lighting device according to claim 10, wherein the inclined surface is provided on an outer peripheral end portion of the light guiding member at a side of a bottom portion of the case, and a space is provided between the case and the inclined surface when the lighting device is assembled.

15. The lighting device according to claim 10, wherein the case has a white bottom portion.

16. The lighting device according to claim 13, wherein a narrow gap is provided between an upper surface of the LED and an upper surface of the LED-accommodating recess.

17. The lighting device according to claim 13, wherein the cut does not communicate with the LED-accommodating recess.

18. The lighting device according to claim 9, wherein the cut comprises a cone-shaped cut.

19. The lighting device according to claim 9, wherein the cut comprises a wedge-shaped cut.

20. The lighting device according to claim 9, further comprising:

an additional LED, wherein the light guiding member has an additional cut to provide a directivity to light emitted from the additional LED, the additional cut being provided at an additional position corresponding to the additional LED on the emission surface side of the light guiding member.

21. The lighting device according to claim 20, wherein the cut comprises a cone-shaped cut, and wherein the additional cut comprises a wedge-shaped cut.

22. The lighting device according to claim 9, wherein the case has a bottom portion, and wherein the bottom portion, the plate-shaped member, and the lens extend planarly and in parallel with each other in at least an area overlapping the LED.

* * * * *